Oct. 28, 1924.
W. M. ANDERSON
1,513,719
EXPANSION AND COMPENSATING DEVICE FOR VALVE ACTUATING MECHANISM
Filed Nov. 23, 1922
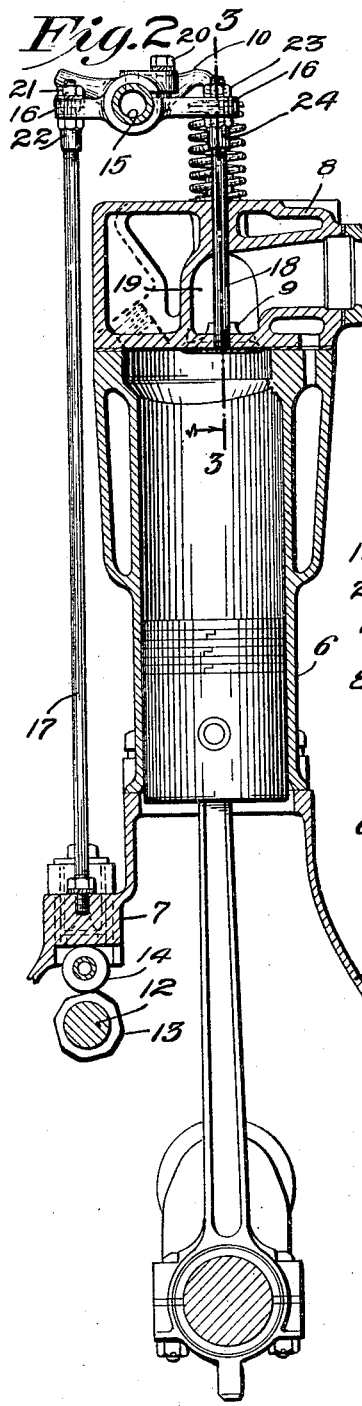
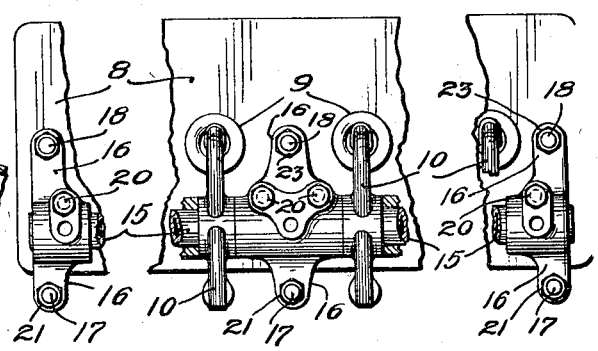
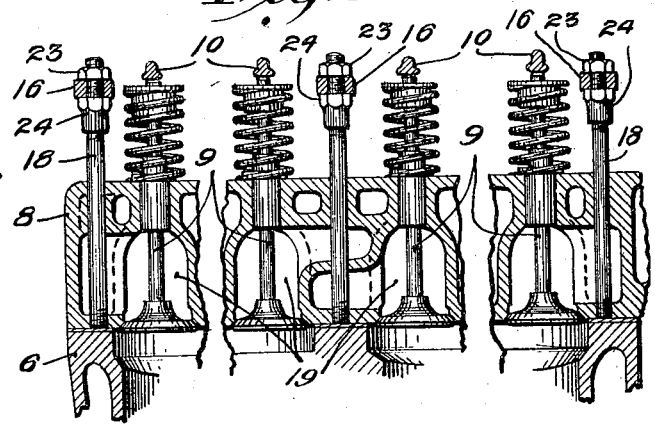
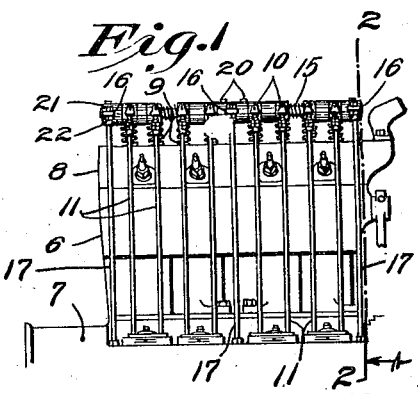
Inventor
William M. Anderson
By his Attorneys Patented Oct. 28, 1924.

1,513,719

UNITED STATES PATENT OFFICE.

WILLIAM M. ANDERSON, OF MINNEAPOLIS, MINNESOTA.

EXPANSION AND COMPENSATING DEVICE FOR VALVE-ACTUATING MECHANISM.

Application filed November 23, 1922. Serial No. 602,756.

*To all whom it may concern:*

Be it known that I, WILLIAM M. ANDERSON, a citizen of the United States, residing at Minneapolis, in the county of Hennepin and State of Minnesota, have invented certain new and useful Improvements in Expansion and Compensating Devices for Valve-Actuating Mechanism; and I do hereby declare the following to be a full, clear, and exact description of the invention, such as will enable others skilled in the art to which it appertains to make and use the same.

My present invention relates to expansion compensating devices for internal combustion engines and is in the nature of an improvement on or refinement of the compensating device disclosed and broadly claimed in my earlier application Serial Number 596,053, filed October 21, 1922.

The invention, while not limited to that use, is especially adapted for application to internal combustion engines of the overhead valve type and, in the accompanying drawings, the same is illustrated as applied to that type of engine. The construction of the prior application so greatly improved the valve action that the valve-actuating connections could be set with but very slight maximum clearance, but my present invention still further improves the valve-actuating means and makes it possible to set the valve-actuating connections with practically no clearance or with such small clearance that the same can hardly be measured by any ordinary means and, for all intents and purposes, the maximum clearance is rendered nil so far as it is objectionably detectable in the valve-actuating operations.

In the said prior application, the invention applied to an engine in accordance with the drawings thereof preferably involved as follows: Mounting of the rockers on a pivot bearing, such as a fulcrum rocker; supporting such pivot bearing or fulcrum rod on a fulcrum support connected to and carried by the engine head or upper portion of the cylinder structure and capable of slight angular movement in respect thereto; and connecting the extended portion of the fulcrum support to the base of the engine by compensating rods or devices having substantially the same co-efficient of expansion as the valve-actuating rods. The salient feature of improvement in the present application over the prior application is the use of compensating expansion rods or devices having substantially the same co-efficient of expansion as the valve stems, and which serve to connect the fulcrum support to the head or upper portion of the cylinder structure.

With the feature of improvement just above noted, that slight variation in the valve-actuating connections produced by expansion and contraction of the valve stems is also compensated for and this brings the matter of compensation for uneven expansion and contraction between the cylinder structure and the valve-actuating connections and valves themselves to a point of substantial perfection.

In the accompanying drawings, which illustrate the invention, like characters indicate like parts throughout the several views.

Referring to the drawings:

Fig. 1 is a side elevation showing my invention applied to an upright multi-cylinder engine of the overhead valve type, some parts being diagrammatically indicated and some parts being broken away;

Fig. 2 is an enlarged transverse vertical section taken on the line 2—2 of Fig. 1;

Fig. 3 is a fragmentary longitudinal vertical section taken on the line 3—3 of Fig. 2;

Fig. 4 is a fragmentary plan view of the parts shown in Fig. 3; and

Fig. 5 is a fragmentary detail in plan showing the outer end of one of the fulcrum-rod-supporting arms.

Of the parts of the engine, it is desirable for the purposes of this case only to particularly note as follows:

The cylinder casting proper 6, the engine base 7, the cylinder head 8, the overhead valves 9 (both intake and exhaust), the valve-actuating rockers 10, the rocker-actuating rods 11, and the cam shaft 12, with the customary cams 13, said rods 11 at their lower ends being guided by bearings in the engine base in the usual way and provided with the customary rollers 14 that are subject to the cams 13.

In the present engine, as in the engine of my prior application, the rockers 10 are intermediately pivoted on a fulcrum rod 15, which, at its ends and preferably also at certain intermediate points, is securely held by fulcrum-supporting arms 16, the outer ends of which arms are connected to the upper ends of compensating rods 17, which rods are parallel to and closely associated with the valve-actuating rods 11, have approximately the same co-efficient of expansion, and at their lower ends are anchored to the engine base 7. In the present instance, however, and as a marked improvement over the construction of my prior application, the inner ends of the fulcrum supporting arms 16, instead of being directly connected to the cylinder head 8, are indirectly connected to the cylinder head by means of expansion compensating rods 18, which, in turn, are anchored at their lower ends to the cylinder head or upper portion of the cylinder structure. By reference particularly to Figs. 2 and 3, it will be seen that these rods 18 are of substantially the same size and length as the stems of the puppet valves 9 and, hence, have approximately the same co-efficient of expansion. Moreover, these rods 18 are subjected to approximately the same heat conditions as the valve stems, because, as will be noted, they are passed down through the upper portion of the cylinder head and through the exhaust cavities 19 and are anchored at their extreme lower ends to the lowermost portion of said cylinder head. In practice, I have found that there is not a great difference between the temperature at which the admission valves and exhaust valves are subjected, but somewhat the better results are obtained by passing these compensating rods 18 through the exhaust cavities where they will be more certain to receive substantially the same heat conditions as the stems of the exhaust valves.

In the preferred construction illustrated, the fulcrum-supporting arms 16 have split sleeve portions that embrace the fulcrum rod 15 and are clamped thereon by machine screws 20; the upper ends of the compensating rods 17 are adjstably clamped to the outer ends of the arms 16 by cooperating nuts 21 and 22; and the upper ends of the compensating rods 18 are connected to the inner ends of the arms 16 by cooperating nuts 23 and 24. Moreover, as illustrated in Fig. 5, the upper ends of the rods 17 are securable in slots 26 in the extreme outer ends of the arms 16 and, hence, are capable of slight adjustments toward and from the fulcrum rod 15.

With the present invention applied as above illustrated and described, it is evident that the compensating rods 17 compensate for expansion and contraction of the valve-actuating rods 11, that the compensating rods 18, in themselves, compensate for expansion and contraction of the valve stems, and that the said rods 18 will transmit the inner ends of the rods, whatever expansion or contraction takes place in the cylinder structure, and that these several compensating actions will so adjust the fulcrum rod 15 and rockers 10 that there will be no perceptible variation in the valve-actuating action produced, whether the engine is running hot or cold. This makes it possible to set the valve-actuating connections to operate the valves at any time, towit: whether the engine is hot or cold, with substantially no clearance, slack, or play, and to automatically maintain such adjustments under all conditions.

It will, of corse, be understood that while the drawings illustrate what is now believed to be the preferred embodiment of my present invention, that the invention is not limited thereto but, on the contrary, is capable of various modifications and re-arrangements embodying the principles of construction herein disclosed.

What I claim is:

1. An internal combustion engine having extended valve-actuating connections and provided with thermally influenced compensating means associated with said valve-actuating connections and arranged to offset the effect on said valve-actuating connections, of expansion and constraction of the cylinder structure, said compensating means including compensating rods extended within the cylinder head structure and anchored thereto substantially in the plane of said valves and having substantially the same coefficient of expansion as the said valves.

2. An internal combustion engine having valve-actuating connections including rockers and provided with thermally influenced compensating rods, certain of which compensating rods are associated with the valve-actuating rods and certain of which are associated with the engine valves, the former of which rods have approximately the same co-efficient of expansion as said valve-actuating rods and the latter of which compensating rods have the same co-efficient of expansion as the valves with which they are associated, said compensating rods serving to offset the effect, on said valve-actuating connections, of expansion and contraction.

3. The structure defined in claim 2 in which the first noted compensating rods are closely associated with the valve-actuating rods, extend parallel thereto and are approximately co-extensive therewith, and in which the second noted compensating rods are extended through the cylinder head structure close to the engine valves and are approximately co-extensive with said valves.

4. The combination with an internal combustion engine of the overhead valve type having valve-actuating connections including a fulcrum rod, valve-actuating rockers intermediately pivoted on said fulcrum rod, and valve-actuating rods operating on said rockers, of rocker-supporting arms intermediately secured to said fulcrum rod, relatively long compensating rods connecting the outer ends of said fulcrum-supporting arms to the engine base and extending approximately parallel to said valve-actuating rods, and relatively short compensating rods connected to the inner ends of said fulcrum-supporting arms, extended approximately parallel to the valve stems through valve cavities in the cylinder head structure and anchored to the latter at their lower ends.

5. The structure defined in claim 4 in which said long compensating rods have approximately the same co-efficient of expansion as the valve-actuating rods and said short compensating rods have approximately the same co-efficient of expansion as the valve stems.

6. In an internal combustion engine of the multi-cylinder type, valves applied in the cylinder head structure and having projecting stems, rockers for engaging said valve stems to actuate said valves, a fulcrum shaft on which said rockers are intermediately pivoted, fulcrum shaft supports projecting inward and outward therefrom, valve-actuating rods operative on the outer ends of said rockers, compensating rods connected to the outer ends of said fulcrum supports and anchored to the engine base, and relatively short compensating rods anchored in the cylinder head structure and connected to and supporting the inner ends of said shaft supports.

In testimony whereof I affix my signature.

WILLIAM M. ANDERSON.